United States Patent Office 2,981,670
Patented Apr. 25, 1961

2,981,670

IRRADIATION OF OLEFINS AND MIXTURES THEREOF WITH ALCOHOLS

Charles E. Stoops and James M. Day, Bartlesville, Okla., assignors to Phillips Petroleum Company, a corporation of Delaware No Drawing. Filed Nov. 21, 1955, Ser. No. 548,233

11 Claims. (Cl. 204—158)

This invention relates to the irradiation of olefins and a mixture thereof with alcohols.

Heretofore, considerable difficulties have been encountered in producing alcohols of high molecular weight, i.e., containing nine or more carbon atoms per molecule. We have found that such alcohols can be produced by subjecting a mixture of an olefin and a low molecular weight alcohol to ionizing radiation.

It is an object of the invention to provide a new method of producing high molecular weight alcohols.

It is a further object of the invention to provide a new way to make high molecular weight alcohols and/or polyolefins.

The alcohols applicable as starting materials in the process of the invention are primary alcohols having the formula $R_1$—$CH_2OH$ where $R_1$ is H or an alkyl group containing 1 to 10 carbon atoms, for example, methanol, ethanol, 1-butanol, 1-pentanol, 1-octanol, 1-hendecanol, 4-ethyl-1-nonanol, 3,4-dimethyl-1-hexanol, 3-methyl-1-pentanol, 4-ethyl-5-methyl-1-octanol and 2,2-dimethyl-1-heptanol. The invention is also applicable to secondary alcohols having the formula

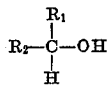

where $R_1$ and $R_2$ are alkyl groups as previously defined which, however, can have the same or different numbers of carbon atoms wherein the sum of $R_1$ and $R_2$ does not exceed 10. Specific examples of such alcohols are isopropanol, 2-butanol, 3-pentanol, 2-octanol, 3-hendecanol, 4-decanol, 2-methyl-4-hexanol, 4-ethyl-2-octanol, 5,7-dimethyl-3-nonanol, 2-methyl-6-ethyl-4-octanol, 6,6-dimethyl-4-heptanol and 4-methyl-2-pentanol.

The olefins applicable to the process are those containing 2 to 12 carbon atoms, such as ethylene, propylene, 1-hexene, 6-ethyl-1-decene and 1-dodecene. Monoolefins, diolefins or aromatic olefins can be employed. Thus, in addition to materials such as ethylene and 1-dodecene, suitable olefinic starting materials are conjugated dienes such as butadiene and isoprene and aromatic olefins such as styrene, alpha-methylstyrene and the like.

The reaction of a primary alcohol having more than one carbon atom and an olefin produces a secondary alcohol having the formula

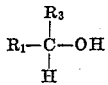

where $R_3$ is a hydrocarbon group (alkyl if the olefin is an unsubstituted aliphatic olefin), the number of carbon atoms in which is a multiple of the number of carbon atoms in the olefin charged to the reaction. Irradiation of a secondary alcohol-olefin mixture produces a tertiary alcohol having the formula

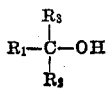

The reaction of methanol and ethylene is a special case, and produces a high molecular weight straight chain primary alcohol.

There is also produced in addition to the high molecular weight alcohol, a polyolefin polymer, the chain length of which varies with the conditions under which the irradiation takes place.

In a preferred embodiment of the invention, methyl alcohol and ethylene are irradiated to produce a mixture of primary alcohols melting within the range of 65 to 90° C. and having a molecular weight corresponding to a carbon chain length of 18 to 32 carbon atoms per molecule.

Preferably and advantageously, the irradiation is conducted by placing the mixture of olefin and low molecular weight alcohol adjacent a spent fuel element or group of fuel elements after their withdrawal from a nuclear reactor. Thus, the irradiation can be conveniently carried out while the elements are "cooling off" in a canal adjacent the reactor, which canal is filled with deionized water. The fuel elements can be any suitable type which are capable of producing radiation intensities within the range hereafter specified. In one specific example, these fuel elements were removed from a nuclear reactor and the active portion of the fuel elements was defined by a series of aluminum clad uranium alloy plates enriched in uranium-235.

The material to be irradiated is placed sufficiently close to the fuel elements to obtain a dosage of $1 \times 10^3$ to $1 \times 10^{10}$ roentgens per hour with a total dosage of $10^5$ to $10^{11}$ roentgens. The radiation produced by the spent fuel elements previously described is gamma radiation. However, other types of ionizing radiation, such as beta rays, X rays, alpha rays and the like, can be employed provided the prescribed radiation intensity and dosage are utilized. It will be apparent from the foregoing that the time of the radiation is not critical and can vary from a few seconds to several hours provided the prescribed dosage and radiation intensity are maintained.

The temperature and pressure at which the irradiation is conducted are not critical. The temperature will ordinarily vary from —100 to 500° F.

The ratio of alcohol to olefin in the mixture can vary over a rather wide range. For example, the amount of olefin can vary from 0.1 to 100 mols per mol of alcohol in the mixture.

The following are specific examples of the process of the invention.

*Example I*

An aluminum bomb of 200 cc. capacity, which had previously been evacuated, was charged with 32.2 grams of methyl alcohol and 4.3 grams of ethylene. The pressure in the bomb after the reactants were charged was approximately 250 p.s.i.g. at about 75° F. The material in the bomb was irradiated in a field of gamma rays from spent fuel elements from the Materials Testing Reactor at Arco, Idaho, at a temperature of 75° F. for a time sufficient to provide a dosage of $1 \times 10^8$ roentgens. After removing the irradiated sample from the gamma ray field, unreacted ethylene and methyl alcohol were separated by conventional means and the product was subjected to an infrared analysis, which indicated it to be a normal primary alcohol containing about 20 to 30 carbon atoms per molecule. The analysis further indicated that no carbonyl, ether, ester, or carboxyl oxygen was present and that there were no internal methyl branches in the molecule. The analysis further indicated the absence of olefinic and aromatic hydrocarbons. It was found that fractional melting would separate the material into two fractions, one, a mixture of primary alcohols, melting in the range of 70 to 85° C. and a second, polyethylenes, melting in the range of 143 to 157° C.

*Example II*

A mixture of methyl alcohol and ethylene contained in an aluminum bomb was irradiated for 16.5 hours at $3.03 \times 10^6$ roentgens per hour (total dose of $5 \times 10^7$ roentgens). After separation of ethylene and methyl alcohol from the reaction mixture, a wax-like product was recovered. Examination of this material showed the product to be a mixture of primary alcohols and a polymer of ethylene having substantially the same characteristics as described in Example I.

*Example III*

A series of samples was prepared in which a mixture of ethylene and one of the following alcohols was charged to an aluminum bomb in a manner similar to that disclosed in Example I. In the first sample, 57.5 grams of ethyl alcohol and 6.4 grams of ethylene constituted the reactants. This mixture was irradiated at about 75° F. for 39 hours at $2.56 \times 10^6$ roentgens per hour (dose of $1 \times 10^8$ roentgens). After the sample was removed from the field of radiation, it was vented and ethyl alcohol and dissolved ethylene were removed by evacuating at room temperature. Approximately 6 grams of a waxlike product was recovered. An examination of this product by infrared analysis was made. Examination showed that a secondary alcohol of average molecular weight of $C_{30}H_{61}OH$ and a high molecular weight polymer of ethylene were present. Similar runs in which a mixture of normal propyl alcohol and ethylene and isopropyl alcohol and ethylene were irradiated to a total dose of $1 \times 10^8$ roentgens were carried out. Examination of the products which were recovered in a similar manner indicated that the reaction of ethylene with normal propyl alcohol yielded a secondary alcohol with an average molecular weight corresponding to $C_{30}H_{61}OH$ and that the product from isopropyl alcohol and ethylene contained a tertiary alcohol with an average molecular weight corresponding to $C_{30}H_{61}OH$. A relatively high molecular weight polymer of ethylene was also present in both of the latter products.

While the invention has been described in connection with certain preferred embodiments thereof, it will be understood that these examples are only for purposes of illustration, and are not to be taken as limiting the invention.

We claim:

1. A process of making a high molecular weight alcohol which comprises subjecting a mixture containing a low molecular weight alcohol and an olefin to ionizing radiation having an energy level of at least 28 e.v. at a level of $10^3$ to $10^{10}$ roentgens per hour for a time sufficient to produce a total dosage of $10^5$ to $10^{11}$ roentgens, the amount of said olefin employed being from 0.1 to 100 mols per mol of said alcohol employed, recovering the resulting solid products, and separating said high molecular weight alcohol from said solid products.

2. The method of producing a high molecular weight alcohol which comprises reacting an alcohol selected from the group consisting of $$R_1\text{—}CH_2OH \quad \text{and} \quad R_2\text{—}\underset{\underset{H}{|}}{\overset{\overset{R_1}{|}}{C}}\text{—}OH$$

where $R_1$ and $R_2$ are hydrogen or alkyl groups containing 1 to 10 carbon atoms with an olefin containing 2 to 12 carbon atoms in the presence of ionizing radiation having an energy level of at least 28 e.v. at a level of $10^3$ to $10^{10}$ roentgens per hour for a time sufficient to provide a total radiation dosage of $10^5$ to $10^{11}$ roentgens, the amount of said olefin employed being from 0.1 to 100 mols per mol of said alcohol employed, recovering the resulting solid products, and separating said high molecular weight alcohol from said solid products.

3. The process of claim 2 wherein the ionizing radiation is gamma radiation.

4. The method of claim 3 wherein the olefin is ethylene and the alcohol is ethyl alcohol.

5. The method of claim 3 wherein the olefin is ethylene and the alcohol is normal propyl alcohol.

6. The method of claim 3 wherein the olefin is ethylene and the alcohol is methyl alcohol.

7. The method of claim 3 in which the olefin is ethylene and the alcohol is isopropyl alcohol.

8. A method of producing a high molecular weight alcohol which comprises subjecting a mixture containing ethylene and an alcohol selected from the group consisting of methyl alcohol, ethyl alcohol, n-propyl alcohol and isopropyl alcohol to gamma radiation at a level of $10^3$ to $10^{10}$ roentgens per hour for a time sufficient to provide a total dosage of $10^5$ to $10^{11}$ roentgens, the amount of ethylene employed being from 0.1 to 100 mols per mol of said alcohol employed, recovering the resulting solid products, and separating said high molecular weight alcohol from said solid products.

9. The method according to claim 8 wherein said separation of said high molecular weight alcohol is accomplished by the fractional melting of said solid products.

10. The method according to claim 1 wherein said ionizing radiation is conducted by placing said mixture adjacent a spent fuel element from a nuclear reactor.

11. The method according to claim 8 wherein said gamma radiation is conducted by placing said mixture adjacent a spent uranium-235 fuel element.

References Cited in the file of this patent

UNITED STATES PATENTS

| | | |
|---|---|---|
| 2,661,331 | Howard | Dec. 1, 1953 |
| 2,679,476 | Joffre | May 25, 1954 |
| 2,743,223 | McClinton et al. | Apr. 24, 1956 |

FOREIGN PATENTS

| | | |
|---|---|---|
| 714,843 | Great Britain | Sept. 1, 1954 |

OTHER REFERENCES

Lewis et al.: "Chemical Engineering Progress," vol. 50, No. 5, pp. 249–255, May 1954.